United States Patent Office 2,906,305
Patented Sept. 29, 1959

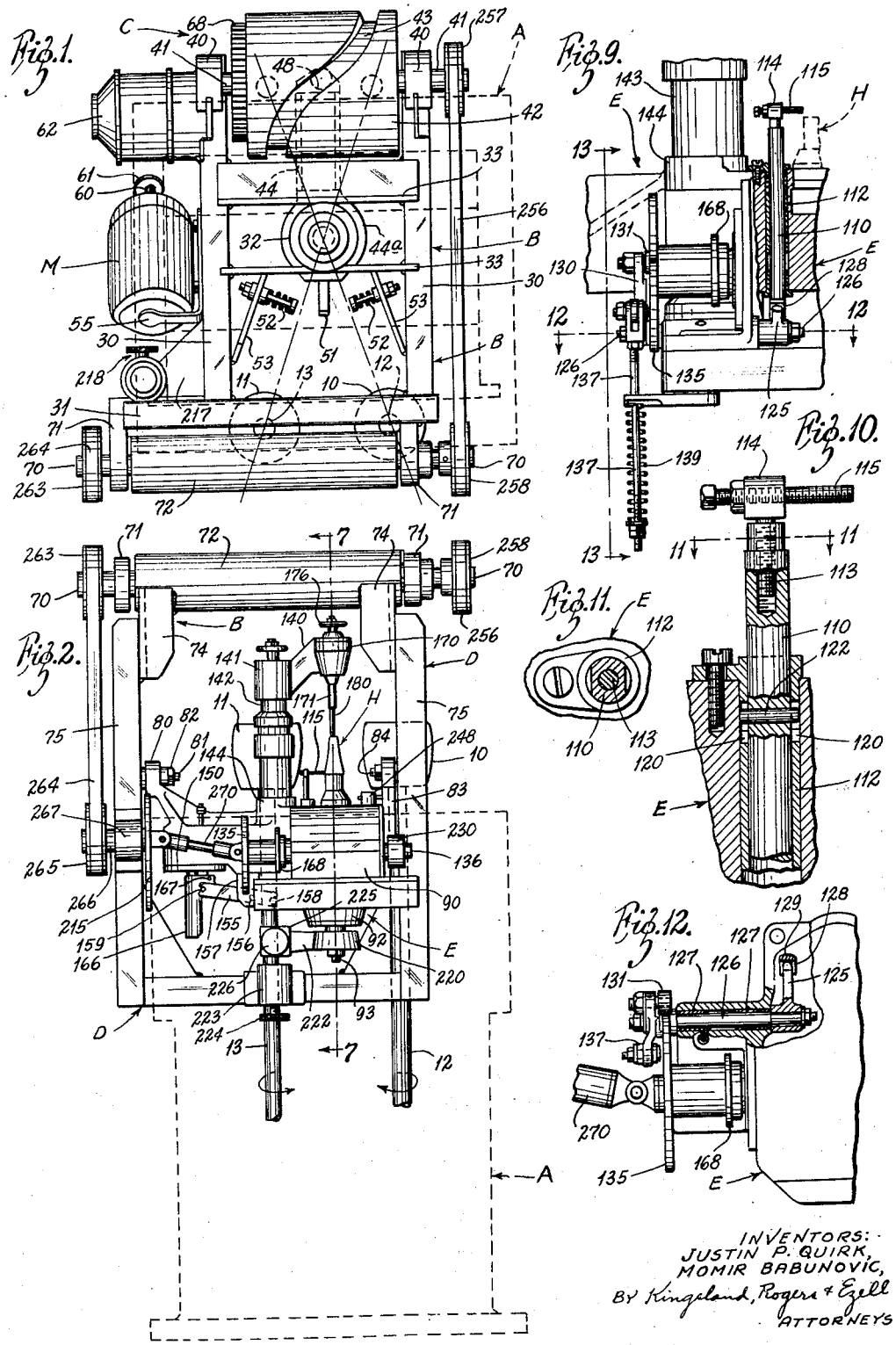

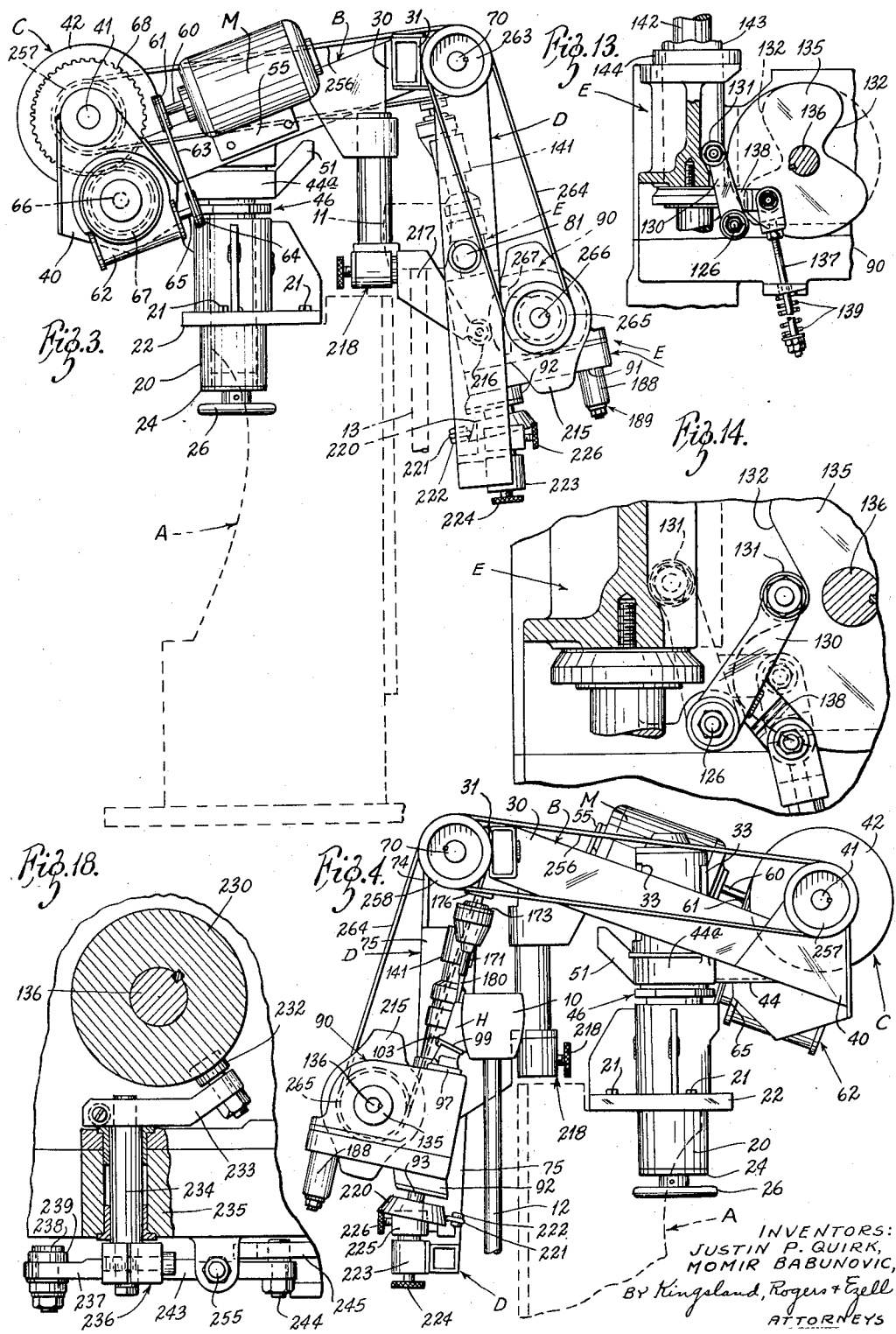

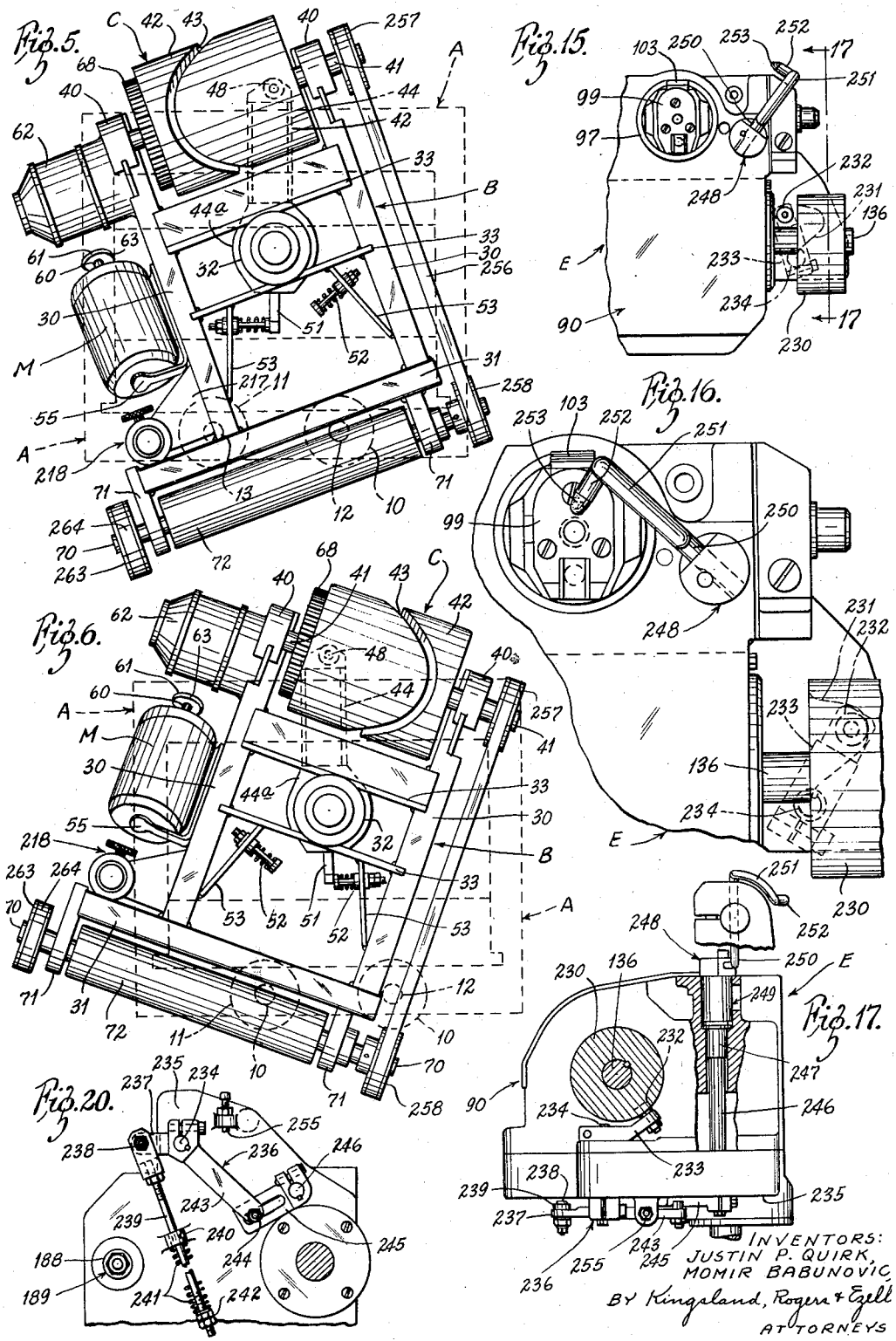

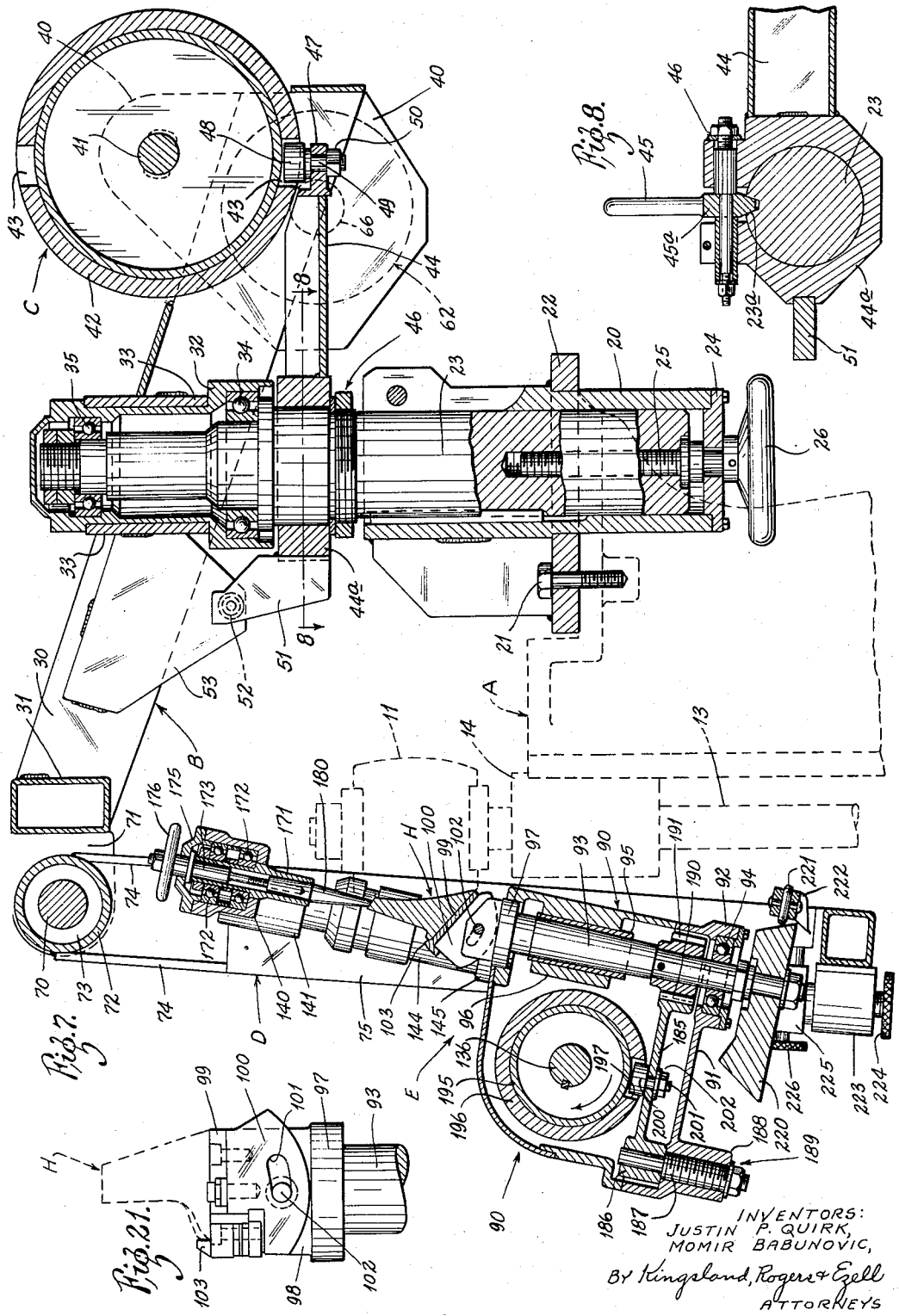

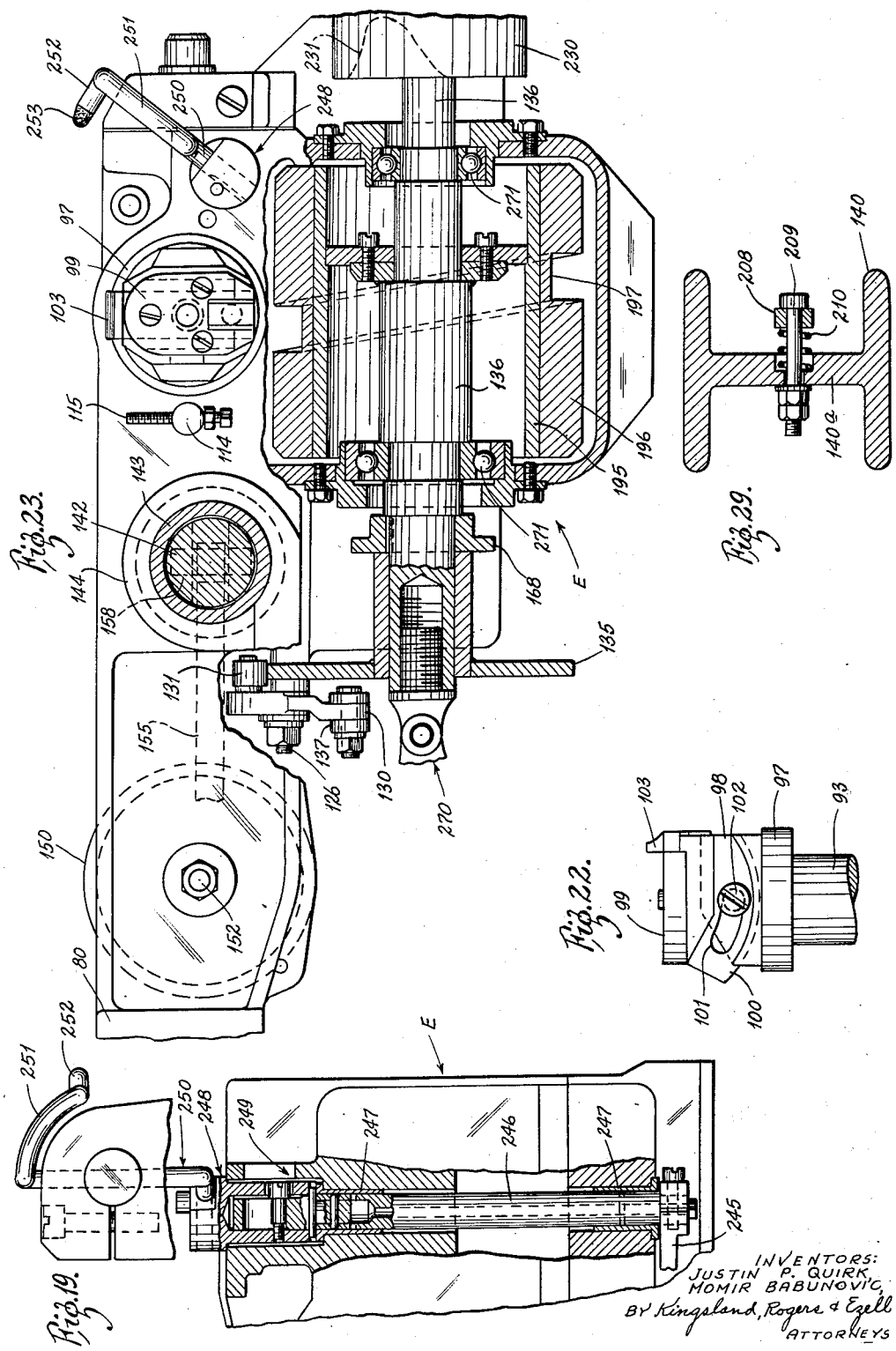

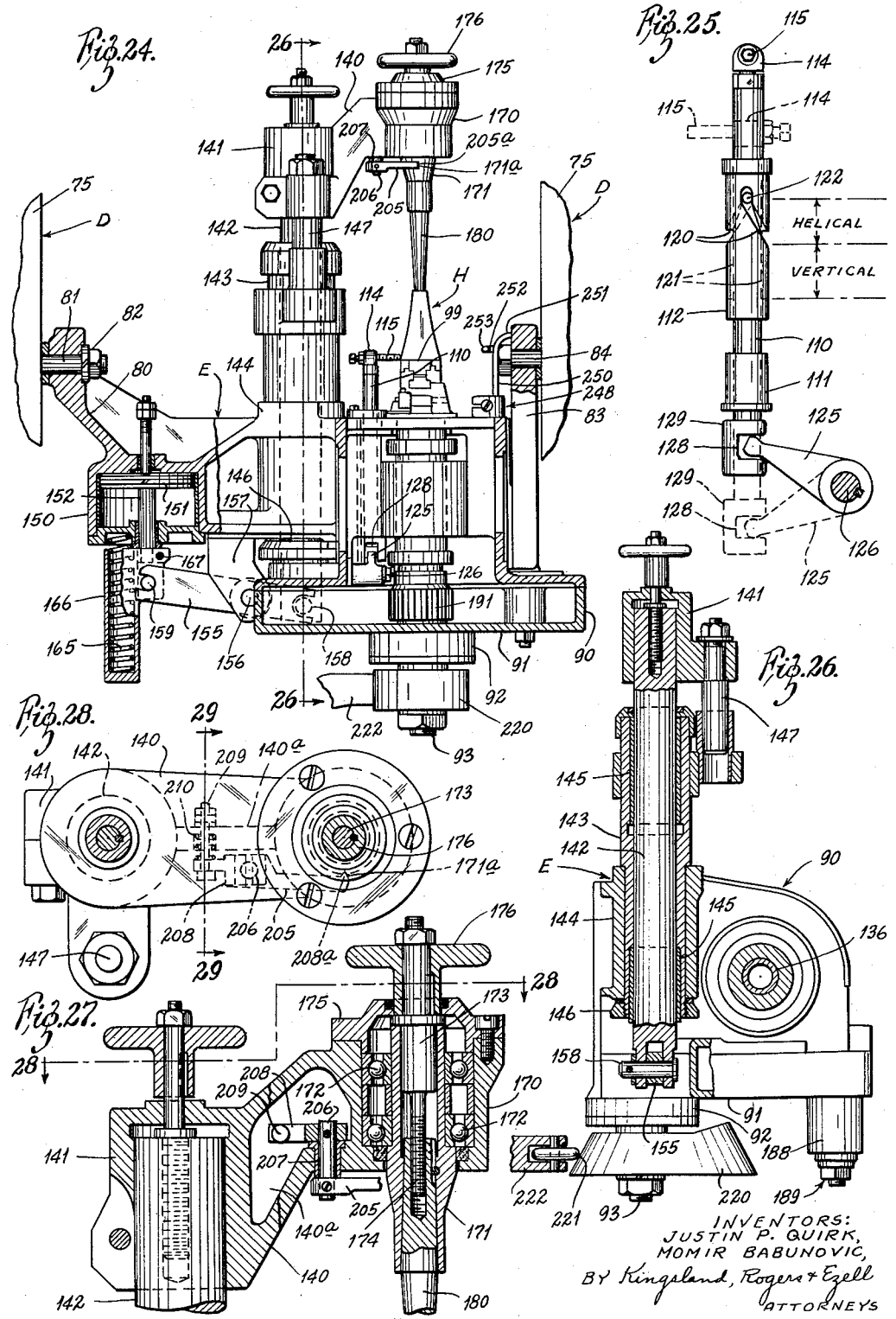

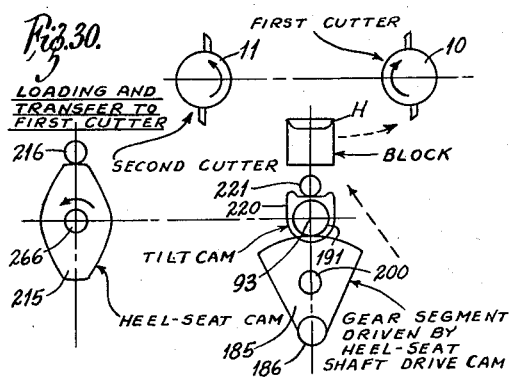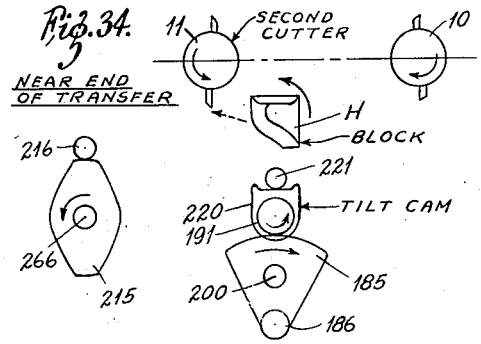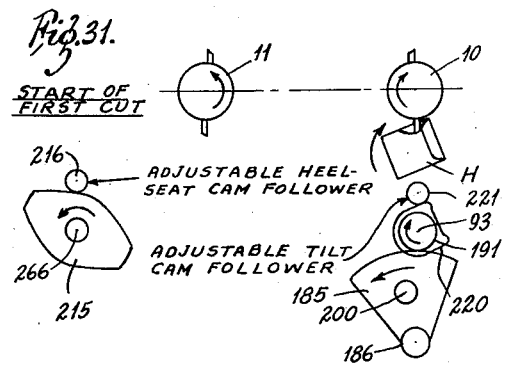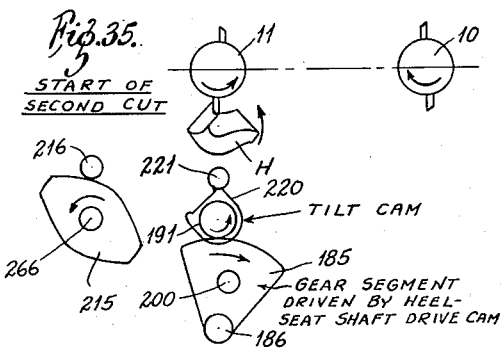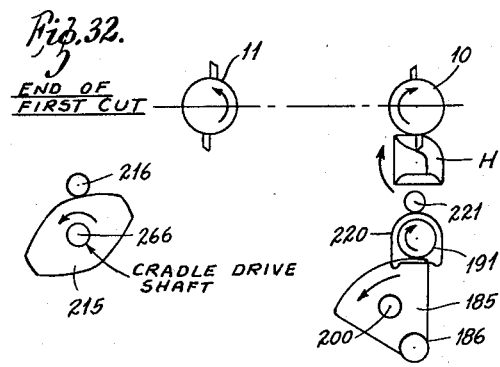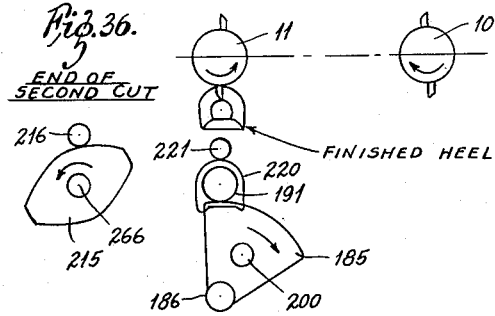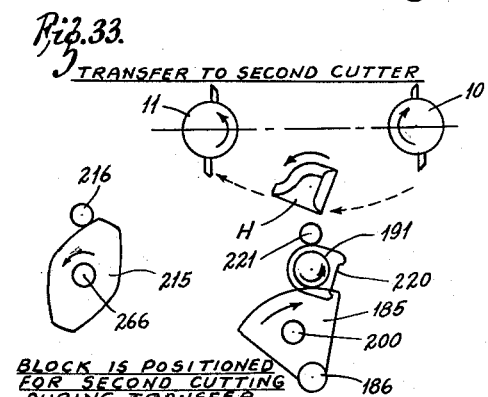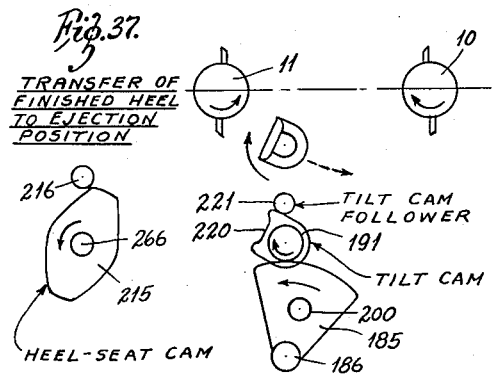

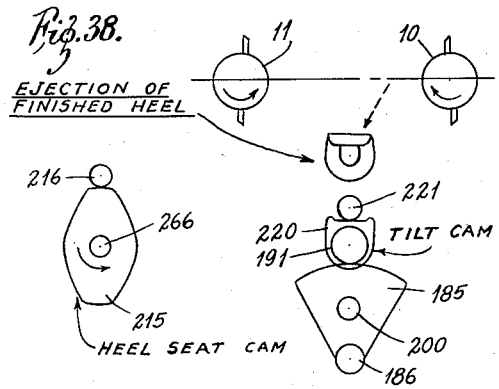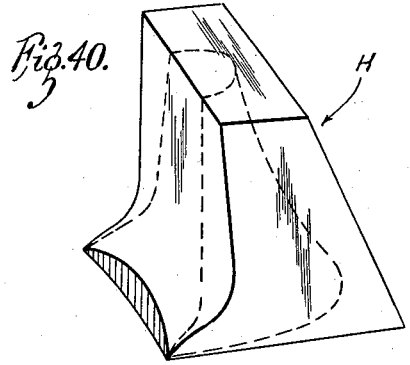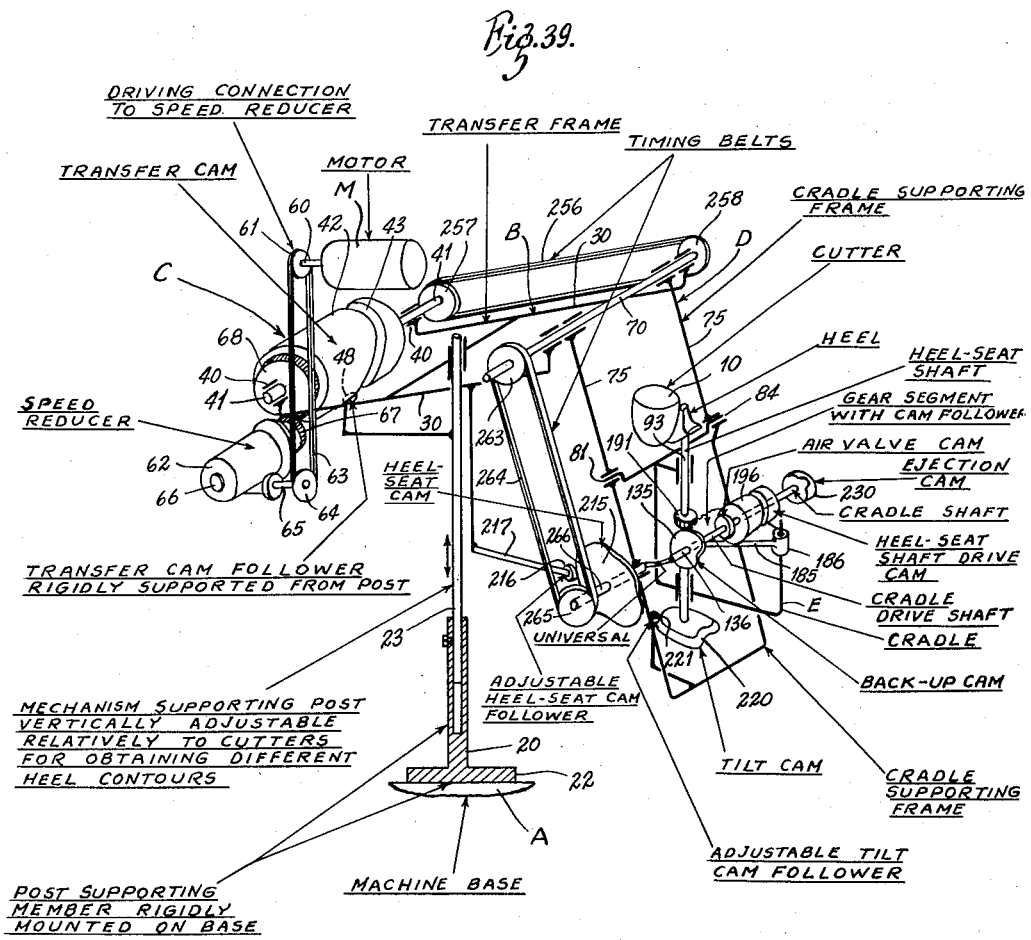

2,906,305

FEEDING MECHANISM FOR ROTARY CUTTING MACHINES TO PROFILE ARTICLES FROM BLANKS

Justin P. Quirk, St. Louis, and Momir Babunovic, Kirkwood, Mo.

Application October 4, 1956, Serial No. 613,847

20 Claims. (Cl. 144—143)

This invention relates generally to feeding mechanism for rotary cutting machines to profile such articles as wood heels from wood blocks, although the mechanism is adaptable and useful in performing the profiling operation on blanks of material other than wood, such as non-ferrous metal, plastics and similar material capable of being cut by a rotary cutter.

An object of the invention generally is to provide mechanism of this type which is fully automatic in the performance of the feeding of the blank to the rotary cutter in such a manner that articles of varying contour may be produced without manual intervention except to position the blank, after which the surface of the blank is presented to the periphery of the cutter element to cut the article to varying contours, sizes and shapes.

The profiling of wood blanks such as wood heels presents particular problems because of the nature of the material, but blanks of other materials such as these mentioned may be produced by rotary cutting when the work piece is accurately presented to the cutter by providing for movement of the work piece to the several varying positions to permit the cutter to follow the contours required in the finished articles.

The accurate production of such articles requires that the blank be moved from a loading station in and out toward and away from the cutter element, an arcuate movement in respect of the cutter; the angularity regulated during such operation, all in timed relationship, in order to produce uniform articles of a predetermined pattern.

A primary object of the invention, therefore, is to provide mechanism whereby these primary movements required are automatically and accurately performed in timed sequence.

In addition, in some instances, it is advantageous to cut the articles on opposite sides of the blanks, for example, in the cutting of wood to conform with the gain. Therefore, the invention includes as an object to provide a transfer movement to swing the blank from cutting position from one cutter to another cutter, which movement is likewise synchronized with the primary cutting movements.

In some apparatus, it is an advantage to change the speed during the progress of the cutting operation, and it is a further object to incorporate this feature in the embodiment of the invention.

Inasmuch as the size, shape and contours of articles produced may vary widely, it is an advantage that adjustment and substitutions of operating parts may be made with ease and economy of time.

Therefore, it is a further object to provide a construction by which this advantage is attained.

Additional objects of the invention will appear from the following description of one embodiment in which the mechanism is described and illustrated in connection with the production of wood shoe heels, although it will be understood that the blank and product may be of other types and of other materials, and likewise, while the embodiment is a feed mechanism for a rotary cutting operation, the feeding mechanism may be employed to follow the contours of other articles for such operations as surface polishing, and sanding, and the like, by substitution of appropriate tools.

In the following description, reference is made to the accompanying drawings, in which:

Figure 1 is a top plan view of the feeding mechanism in association with dual rotary cutters;

Figure 2 is a front elevation of the same structure;

Figure 3 is an elevation viewing the same mechanism from the left side of the machine;

Figure 4 is a similar view from the right or opposite side;

Figure 5 is a top plan view, showing the feeding mechanism moved to a position in associated with one of the cutters;

Figure 6 is a similar view with the feeding mechanism positioned in relation to the other cutter;

Figure 7 is an enlarged vertical sectional view, substantially on the line 7—7 of Figure 2;

Figure 8 is a horizontal sectional view taken substantially on the line 8—8 of Figure 7;

Figure 9 is a partial view in front elevation of the backup sub-assembly of the parts being shown in section;

Figure 10 is an enlarged view of a part of the mechanism illustrated in Figure 9;

Figure 11 is a horizontal sectional view taken substantially on the line 11—11 of Figure 10;

Figure 12 is a horizontal sectional view taken substantially on the line 12—12 of Figure 9;

Figure 13 is a fragmentary vertical sectional view taken substantially on the line 13—13 of Figure 9;

Figure 14 is an enlarged view of a part of the mechanism as illustrated in Figure 13;

Figure 15 is a partial plan view of the ejection subassembly mechanism;

Figure 16 is an enlarged view of part of the mechanism of Figure 15, with the mechanism in position to eject the finished article;

Figure 17 is a vertical view partially in section, taken substantially on the line 17—17 of Figure 15;

Figure 18 is an enlarged sectional portion of part of the mechanism illustrated in Figure 17;

Figure 19 is an additional enlarged section of a part of the mechanism shown in Figure 17;

Figure 20 is a bottom plan view of the mechanism illustrated in Figure 17;

Figure 21 is an enlarged elevation of the heel seat section of the mechanism viewed from the right-hand side;

Figure 22 is a similar view, viewed from the left-hand side of the same mechanism;

Figure 23 is an enlarged top plan view partially in section of the cradle mechanism, wherein the work piece is supported;

Figure 24 is an enlarged fragmentary front elevation partly in section of the mechanism illustrated in Figure 2;

Figure 25 is a view of certain parts of the positioning mechanism, diagrammatically illustrating the movements thereof;

Figure 26 is a vertical sectional view taken on the line 26—26 of Figure 24;

Figure 27 is an enlarged sectional view of a part of the mechanism illustrated in Figure 24;

Figure 28 is a partial section in plan view, taken substantially on the line 28—28 of Figure 27;

Figure 29 is an enlarged vertical section, taken substantially on the line 29—29 of Figure 28;

Figures 30-38, inclusive, are diagrammatic views to illustrate a complete cycle of the operations performed by the mechanism;

Figure 39 is a schematic view of the principal parts of the mechanism showing the association of the various movements of the complete feeding mechanism; and Figure 40 illustrates one form of blank upon which the mechanism operates to produce the structure of a heel, as shown by broken lines.

The embodiment of the invention illustrated includes a base A of general shape, the front of which is illustrated in dotted lines in Figure 2, the side outline in Figures 3 and 4, and the top in Figures 1, 5 and 6.

The cutter unit with which the feeding unit of the invention is associated includes, as illustrated, spaced cutters 10 and 11 removably mounted on cutter shafts 12 and 13 journaled in bearings, indicated at 14 in Figure 7, supported by the front of the base A. Any suitable source of power (not shown) may be employed to rotate the cutter shafts at relatively high speed and in the desired direction, and of the order of 8500 r.p.m.

A post supporting member 20 is rigidly mounted at the rear of the base A in any suitable manner, but as illustrated is bolted to the top face of the base by bolts 21 and into the base, and passes through a flange 22 surrounding and integral with the member 20.

The member 20 is a hollow column of adequate strength to receive in telescoping relation a post member 23. At the open lower end of the column 20 is attached a plate 24 having a central opening in which the shank of a screw jack member 25 is mounted. This member threads into and cooperates with a threaded opening in the lower section of the member 23. The member 25 at its outer end is provided with a hand wheel 26 whereby the member 23 may be manipulated to raise and lower it in its support.

As will appear, the purpose of this adjustment is to raise or lower the feeding mechanism unit in respect of the cutter elements in order to provide for cutting varying contours in profiling the work piece. The structure just described is best illustrated in Figure 7, as well as that of the superstructure supported by the post member 23 about to be described.

At the upper end of the member 23, a frame structure B is mounted for swinging movement. This frame includes side members 30 connected at its front end by a cross member 31.

It is preferred to construct this frame of metal walls in rectangular formation in cross section to give strength to the frame, with a minimum degree of weight. This frame is rigidly connected to a bearing sleeve 32 by transverse plates 33 attached at their intermediate sections to the front and rear faces of the bearing sleeve 32, and at their outer extremities to the side member 30, respectively, of the frame B. The entire frame structure is freely revoluble on the upper section of the post member 23. Roller bearings 34 and 35 are provided to insure free frictionless mounting for the frame so that it may swing on its pivot with a minimum degree of power.

At the rear of the frame B, and rigidly attached to the side members 30 are brackets 40. These brackets have bearings therein in which a transverse shaft 41, having extensions at each end beyond the brackets 40, is mounted.

A cam structure C is mounted on the shaft 41 intermediate of the brackets 40 and, as this device serves as part of the means for moving the work piece from one cutter to the other, as will later be described, it may conveniently be referred to as the "transfer cam." This cam device includes a drum 42, cylindrical in shape, which is attached to the shaft 41 to be rotated therewith. A cam slot 43 is formed on the surface of the member 42.

A rearwardly extending arm 44 is integral with a collar 44a, which is releasably locked to the member 23 by means of an adjustable eccentric manually operable member 45. A nut and washer device 46 maintains the arm 44 in proper horizontal adjustment. The member 45 and its mounting is shown best in Figure 8. The locking of the member 23 is effected by the latch portion 45a of the device extending into a slot 23a in the member 23. The latch is so formed that it may be entirely released so that the frame B may be moved about the member 23 for convenience in assembling or adjusting the parts carried by the arm. The arm 44 may be channel-shaped in cross section, as illustrated, with a flattened extremity 47 forming a support for a cam follower in the form of a roller 48 revolubly mounted on a stud shaft 49 held in place by a nut 50.

The forward end of the arm 44 is in the form of an irregular shaped plate 51 integral therewith. This plate projects upwardly and moves between two spring snubber devices 52 carried by plates 53 on the frame B. Thus, as the frame B is moved in an arc by the cam and follower, these snubbers act as cushioned stops for the frame as it reaches the limit of its arcuate movement, and also serve as a visual indicator to the operator as to the position of the work piece in relation to the cutters.

The entire feeding mechanism is powdered by a motor M supported by a bracket 55 attached to the left side member 30, as viewed in Figure 1. The motor shaft 60 carries at its rear extremity a pulley 61. The motor actuates a speed reducing device of known construction, and the gear case of which is indicated at 62. The speed reducing gear chain is driven directly from the motor, as shown, by a belt 63 operating over a pulley 64 on the power input shaft 65 to the speed reducer. The power output shaft 66 carries a pinion 67, which meshes with a gear 68 on the left hand extension (Figure 1) of the shaft 41, whereby the drum member 42 is actuated at a speed responsive to the setting of the speed reducer.

The work mounting and feeding mechanism later to be described is mounted in a frame D (Figure 2).

The support for the frame D includes a shaft 70 journaled in bearing brackets 71 that project forwardly and are integrally secured at each side of the cross member 31 of the frame B. A tubular member 72 is fitted over the shaft 70 and is supported at each end in bearings 73 so that the member 72 may rock independently of the shaft 70. Hanger plates 74 project downwardly from the member 72 and are integrally connected thereto at their upper ends, and to side frame members 75 at their lower ends. Thus, the support for the frame D is permitted to move toward and away from the cutter elements on a horizontal pivot which is normal to the axis of the cutting plane of the cutter elements.

A cradle E, best shown in Figure 24, is pivotally mounted in the frame D. The cradle constitutes the mounting for the workpiece and includes the means for mounting and adjusting it, as well as the mechanism for ejecting the finished workpiece. The cradle is so designed that the workpiece may be presented to the cutters in varying angular relationhip, and the means for effecting these adjustments are included within the cradle E.

The cradle includes an irregular shaped casting, the general pattern of which is illustrated in cross section in Figure 24.

By reference to this figure, it will be noted that the upper part of the cradle casting is formed to constitute a bracket arm 80, pivotally mounted on a stud shaft 81 carried by the left side member 75 of the frame D. The member 81 is threaded and a nut and washer 82 removably hold the bracket on its support. At the right of the cradle, there is a second bracket 83 likewise carried by a stud shaft 84 extending inwardly from the right frame member 75, and a nut and washer removably pivotally support the cradle. Thus, the entire cradle is supported on a horizontal pivotal axis normal to the axis of the cutter members.

The lower section of the work support unit includes a housing 90 (Fig. 7) in the bottom wall 91 of which there is a bearing seat 92. A spindle 93 has its lower section mounted in a non-friction bearing member 94. The spindle extends upwardly in the housing and is supported at its upper portion in a loose fitting adjustable bearing sleeve 95 carried by a bracket 96, integral with the right side wall of the housing 90 (Figure 7). The lower extremity of the spindle extends below the bottom wall of said housing and the upper end is enlarged to form a head 97 that seats in an opening in the upper wall of the housing.

The work seat is carried by the head 97 of the spindle 93. An ear 98 extends upwardly from the top surface of the head 97 and the work supporting plate 99 has spaced downwardly extending wings 100 having segmental slots 101 therein. The angularity of the work supporting plate may be adjusted and held in selected positions by movement thereof within the limits of the slots, and held in position by a screw pin 102 which extends through a threaded opening in the ear 98.

For the illustrated embodiment of the invention, the work piece is shown as a wood heel blank H (Figure 40). This blank is preformed as shown with the front surface inwardly cut to form a concave wall.

In placing the work piece on its support, it is important that for profiling the side and back of the blank it be accurately mounted in its support. For this purpose, the work supporting plate has an upstanding adjustable lug 103 (Fig. 21), against which the lower front edge of the blank is placed and thus properly positioned.

In addition to the accurate positioning of the front edge of the blank, it is important that the blank be accurately centered laterally. Since the blanks vary in lateral dimensions at the base, an adjustable device is provided for this purpose, the structural details of which are best shown in Figures 9 to 14, inclusive, and 25.

By reference to Figure 25, it will be noted that a stem 110, which carries the position pin, is mounted for vertical and turning movement in a sleeve 111, and sleeve 112 spaced vertically therefrom. These sleeves are removably supported in the cradle frame E in such a position that the stem extends vertically in the frame with its upper end lying adjacent to the work seat. By reference to Figure 10, it will be noted that the upper face of the stem has a threaded opening therein, and as shown in cross section in Figure 11 is flattened on opposite sides.

The positioning pin carrier includes a threaded shank 113 and a threaded sleeve 114 positioned at the top thereof and extending normal thereto. A threaded headed pin 115 threads through the sleeve 114. This construction provides for both vertical and horizontal adjustments in order that, regardless of the width of the work piece blank, the pin may be positioned to abut against the side of the blank when it is loaded on its seat to properly position the blank.

Obviously the pin contacting the blank when it is positioned when loaded must be moved out of this position when the cutting operation is started, and this is accomplished automatically in timed relation to the cutting by the structure about to be described.

It will be noted particularly by reference to Figure 25 that the sleeve 112 has helically formed slots 120 in its upper section which terminate in vertical slots 121 below it. A pin 122 extends horizontally through the stem 110 and rides in these slots.

Thus, as the stem 110 is lowered, it will first turn from contact position with the work piece H and then further lower in its support, thus moving the pin 115 free of the heel seat area. When the reloading point is reached in the cycle of operation, the pin 115 will be returned to proper adjustment by the raising of the stem 110 on its support.

The means for operating the stem 110 includes an arm 125 keyed to a shaft 126 journaled in bearings 127 (Figure 12) supported in the cradle frame so that the shaft 126 is positioned normal to the stem 110.

The extremity of the arm 125 is formed to ride in a slot 128 in a collar 129 carried by the lower part of the stem 110.

At the opposite end of the shaft 126 is an arm 130 (Fig. 14) at the extremity of which is a roller 131 constituting a cam follower that is arranged to ride in a camway 132 of a cam 135. The cam 135 is carried on the main cradle drive shaft 136, which actuates the various movements of the cradle and work support in timed relation to position the work piece in relation to the cutters for profiling the work piece to predetermined contours, as will more fully appear as the description proceeds.

As shown in Figures 9 and 13, the roller 131 is maintained in contact with the cam 135 by a rod 137, the upper end of which is pivotally connected to an extension 138 on the arm 130. An expansion spring 139 operates to maintain the arm 130 and the roller 131 in operative contact by exerting pressure to urge the arm 130 toward the cam surface.

After the work piece has been placed on its support, it is automatically clamped and held in position by the structure now to be described with particular reference to Figures 7, 24, 26, 27 and 28.

First, by reference particularly to Figures 24 and 27, it will be noted that there is a hollow bracket-like casting 140, which extends inwardly from a collar or sleeve 141, which in turn is carried over the upper end of a cylindrical stem 142. The stem 142 is slidably mounted in a cylindrical sleeve 143, which sleeve in turn is rigidly mounted in a cylindrical support 144 formed as a part of the cradle housing (Fig. 26). Bushings 145 may be interposed between the members 142 and 143 reducing friction when the stem 142 is raised and lowered. A nut 146 threaded over the end of the sleeve 143 serves to rigidly but removably hold that sleeve in its support.

The collar 141 and the sleeve 143 are connected by a guide pin 147 permitting vertical but restrained from rotary movement in respect to each other. Since the member 140 is supported by the member 141, which is carried by the member 142 as the stem 142 reciprocates vertically, the bracket and its carried parts later to be described are raised and lowered.

The reciprocation of the stem 142 is automatic and is operated in timed relation to the other movements of the work feeding mechanism since the actuator for this stem is a cam, later referred to, carried on the main cradle shaft. The structure for accomplishing this movement of the stem is best shown in Figures 24 and 26.

There is an air motor comprising a piston cylinder 150 mounted in a support formed as a part of the cradle housing, in which is a piston 151 actuating a piston stem 152. This stem is mounted for reciprocation through bushings in the upper and lower walls of the piston cylinder housing, as clearly appears by reference to Figure 24.

The air motor serves to raise and lower the stem 142 and its carrier parts through the operating connections which include a lever arm 155 pivoted at 156 in a bracket 157 integral with the cradle casting. This arm 155 is bifurcated at its ends, the inner end operating over a pin 158 at the lower extremity of the stem 142, and the outer end operating over a pin 159. The outer end of the arm 155 is normally in the raised position illustrated in Figure 24, being urged to that position by a strong expansion spring 165 mounted in a tubular housing 166. The lower end of this spring seats against the bottom wall of its housing and the upper end against the bottom wall of the piston housing 150. An ear and clamp device 167 is formed integrally with this housing and serves to support the pin 159, and to clamp the housing 166 to the bottom extremity of the piston pin 152.

The outer end of the arm 155 is actuated to its lower position in response to the downward movement of the piston 151, which is accomplished by the admission of air pressure above the piston by the tripping of an air valve (not shown) by the cam 168 on the main cradle shaft in timed relation to the sequence in the loading, cutting, and an ejection of the work piece to be described in connection with the over-all description of the mechanism. Suffice it to say at this point that when the outer end of the lever 155 is raised the jack pin clamps the work piece to its seat, and when lowered the work piece is released.

The structure for clamping and releasing the work piece may be best understood by reference to Figures 24, 27 and 28.

The jack head is in the form of a casting 170 integrally formed with the inner end of the bracket 140. A tubular shaft 171 is mounted in anti-friction bearings 172 supported in the head. A stem 173 having a reduced threaded lower section 174 extends upwardly through a removable cap 175 for the jack head. A hand wheel 176 serves to manipulate said screw stem.

A jack pin 180 has a threaded recess in its upper portion and is arranged to be mounted in the lower section of the tubular shaft 171. It should be noted that this construction permits the jack pin to be removably mounted. It is contemplated that jack pins of different lengths may be employed, since the work pieces vary in height, and mounting for the pins just described provides a convenient way to interchange the several lengths of jack pins.

The mechanism for imparting the turning movement to the spindle 93 that carries the work piece supported by the work seat on its head includes a segmental rack arm 185 that is pivoted for swinging movement. A hub 186 at the outer end of the arm is rotatably fitted over a pivot pin integral with a stud 187 threaded into a boss 188 depending from the bottom wall 91 of the housing 90. The stud is removably locked in a vertical position by a nut and washer assembly 189. The arrangement described is best seen in Figure 7, where the pivot pin is shown concentric with the stud 187. It is to be noted, however, that this exemplary arrangement may be modified by the eccentric disposition of said pivot pin relatively to said stud whereby to provide an adjustment for minimizing backlash. The forward end of the arm 185 carries integrally therewith a segmental rack 190, which is arranged to mesh with a pinion 191 on the spindle 93.

The actuator imparting to the arm 185 a reciprocating turning movement to rock the spindle 93 comprises a drum 195 keyed to the main cradle drive shaft 136. A sleeve 196 is removably fitted over the drum 195 and a cam slot 197 is formed in the peripheral surface of the sleeve.

A cam roller 200 is supported on the top surface of the arm 185 on a stud 201 which is removably attached to the arm 185 by a nut and washer indicated at 202, as clearly appears in Figure 7.

It will be understood that by selecting the shape of the cam slot 197 the arcuate movement of the arm 185 can be determined both as to extent and relative speed of movement. By making the sleeve 196 removable, the machine may be equipped with cam slots of selected contours to rock the spindle 93 and hence the work piece against the cutters in arcs of greater or less length and at varying speeds of movement. This provides for accommodating the cutting operation to the specific nature of the material of the work pieces, and also to control the extent of the arcuate contact of the work piece blank with the cutters, as well as the direction of the turning movement of the work piece, since the arm will be caused to reciprocate in its arcuate movement in accordance with the selected contour of the cam slot employed to perform the desired profiling operation.

As has been mentioned, the work seat for the work piece blank has provisions for accurately positioning it on the seat. It becomes necessary, therefore, to accurately position the parts before the cutting operation is started. For this purpose, an indexing device is provided. When the work piece is seated and clamped in position and before cutting contact is made, the jack pin mounting is adjusted by means of a device which includes a lever arm or pawl 205, which is mounted on a stem 206, mounted in a sleeve 207 in the bottom wall of the bracket 140. The upper end of the stem 206 has attached thereto an arm 208 which carries an adjustable stem 209 that extends through an opening in a web 140a that is part of the bracket 140. An expansion spring 210 urges the arm outwardly rocking the arm 205 inwardly. (See Figures 24, 27, 28 and 29.) The inner end of the arm 205 is formed with a sharp edge 205a that seats in an angular notch 171a in the wall of the shaft 171 which is so located on the periphery of the member 171 that, when the arm 205, acting as a pawl, seats in the notch (Figure 28), then the work seat is in the proper position to present the work piece to the cutters for the initiation of the cutting operation. The spring 210 exerts only light pressure sufficient to seat the pawl in the detent, but does not restrain the arcuate movement of the work piece during the cutting operation, as the tip of the arm 205 can easily move in and out of the notch. This device merely serves, therefore, as an indexing means to assure that the parts are in position to initiate the cutting operation.

After the work piece has been loaded and clamped in its support, the entire cradle frame D is advanced to cutting position. The mechanical means for effecting this movement includes a cam 215, referred to as the heel seat cam, since this cam is the actuator that moves the heel seat supported in the cradle toward the cutters. The cam 215 is positioned on the main cradle drive shaft 136 in a position to contact a roller 216, which roller is carried at the inner end of a bracket 217. This bracket is adjustably mounted on the main frame of the machine. The adjustment device 218 is arranged to be adjusted inwardly and outwardly so that the roller or cam follower will be set a greater or less distance from the cutters. This adjustment permits the cutting contact with work pieces of varying diameters. It will be noted that the cam 215 is so shaped that it has opposite high and low faces, so that for each revolution there will be an interval of protraction and retraction to and from the cutters, but it should be observed that, by changing the shape of the cam, a single protraction and retraction will occur during one revolution of the shaft 136 so that the cutting adjustment may be maintained throughout a complete cutting operation.

After the work piece has been moved to cutting position by the transfer cam and the mechanism just described, there is provision for varying the angle of contact in order that selected contours of the work piece surface may be produced. The mechanism for this purpose includes a cam 220 having an upwardly inclined face and a width of varying radii. The general shape of this cam already appears by reference to Figure 26. This cam is removably attached to the lower part of the spindle 93. Since its function is to vary the angle or tilt of the work seat carried at the upper end of the spindle 142 constituting the heel seat shaft so designated in Figure 39, it is referred to as the tilt cam in that view of the drawings.

This cam cooperates with a cam follower in the form of a roller 221 revolubly mounted in the bifurcated end of an arm 222. The outer end of this arm is supported by the lower frame member of the cradle supporting frame, and is adjustable both vertically and horizontally. For this purpose, there is provided an internally threaded sleeve 223 carried by said frame member (Figures 4 and 7). An adjustable screw stem 224 is threaded therein and carries a second threaded sleeve 225 in which is mounted a threaded stem 226, which forms the outer extremity of the arm 222. Thus, this arm may be raised and lowered, and also be moved in and out to selectively adjust the cam follower or roller 221 in relation to the surface of the cam 220. Thus, there is provided the means to vary the angularity of the work piece in relation to the cutters in order to provide the means to produce articles of predetermined contours within a wide range of variations.

After each article has been completed, an ejection device is provided for the automatic removal of the article from its work seat. The mechanism for this purpose includes an ejection cam 230 mounted at the lateral extremity of the main cradle shaft 136. This cam has a cam groove 231 formed on its inner surface the contour of which is best illustrated in Figures 15, 16 and 23. The follower is in the form of a roller 232 carried on the free end of an arm 233. The opposite end of this arm is fixed to the upper end of a vertical shaft 234 which is mounted in bearing sleeves provided in a casing 235 carried by the cradle housing (see Figure 18). The lower end of this shaft has fixed thereto a bell crank lever 236. One arm 237 of this lever is pivotally connected at 238 with one end of a rod 239 that is slidably supported in a bearing 240 carried by the lower wall of the cradle housing (see Figure 20). An expansion spring 241 is mounted on the rod and abuts an end face of the bearing 240 and at the opposite end abuts an adjustable nut assembly 242. The purpose of this spring is to maintain the cam roller 232 in the cam groove 231.

The other arm 243 of the bell crank lever 236 has a pin and slot connection 244 with an arm 245. The arm 245 is fixed to the lower end of a vertical shaft 246 (Figures 17 and 19), and is mounted in bearings 247 which are supported in the cradle housing. The upper end of the shaft 246 has an adjustable connection 249 with a head structure 248 (Figure 19). An ejection arm 250 is fixed to the head 248 and has the general shape best shown in Figures 15 through 17 and 19 where it is shown in various positions. It will be noted that the upper end 251 of this arm is curved to permit it to be freely moved toward the work piece on the heelseat.

The extremity 252 of this arm is provided with a rubber tip 253 that contacts the finished work piece to eject it.

It will be understood that the cooperation of the cam roller 232 with the cam groove 231 under the influence of the spring 241 functions to cause the ejection arm 250 to swing in an arc from the position shown in Figure 15 to that shown in Figure 16, to contact the finished work piece and eject it from its seat. This ejection occurs in timed relation in the cycle of operation when the cutting operation has terminated and the jack holding the work piece on the seat has been released. The reverse movement of the arm occurs when the cam follower is moved out of the cam groove and the arm is returned to the position shown in Figure 15.

The extent of the arcuate movement of the arm 250 may be controlled by an adjustable stop 255 which, as illustrated in Figure 20, is in a position to limit the movement of the bell crank lever 236.

The power transmission from the motor M to the transfer cam shaft 41 has heretofore been described. The driving means for operating the main cradle shaft 136 includes a belt drive 256 from a pulley 257 on the shaft 41 to a pulley 258 on one end of the shaft 70. On the opposite end of the shaft 70 is a pulley 263 and a belt drive 264 serves to drive a pulley 265 on a short shaft 266 journaled in a bearing 267 carried by a side member 75 of the frame D. A universal shaft connection 270 is pivoted to the inner end of the shaft 266 at one end and is pivotally connected to the end of the shaft 136 at its opposite end. By reference to Figure 23, it will be noted that the shaft 136 is shown as being supported for rotation in the cradle housing by antifriction bearings 271, thus reducing the power required for operating the machine.

Operation

The continuity of the operation of the machine and the advantages that flow therefrom will be better understood from the general description of a cycle of operation that follows, with especial reference to the diagrammatic illustrations (Figures 30 to 39, inclusive) showing the association of the principal parts of the mechanism and the sequence of movements involved. These views bear legends to facilitate the ready identification of the various parts, and the various phases or steps performed from the loading of the work piece blank to the finished product and its ejection.

The initiation of the operation is the loading of the work blank on the work seat, at which time the frame D, designated in Figure 39 as the cradle supporting frame, is in substantially a vertical position at the front of the base A. The work piece blank is manually loaded on its seat and clamped in position by mechanism heretofore described. To assist in the proper positioning of the blank, the positioning pin is adjusted to constitute a guide abutment for the blank and, as has been described, is moved from this position before the contact with the cutter is made. The so-called backup cam of Figure 39 is the actuator for this purpose. That the heel seat and jack pin are in proper position is insured by the indexing devices and other mechanism already described in detail. This initial phase of the operation is illustrated in Figure 30.

From this initial position, the frame D is moved in the direction of the cutters by the heel seat cam and follower, and at the same time the transfer cam, so designated in Figure 39, moves the frame toward the right or first cutter as viewed in Figure 31, thus bringing the work piece blank into contact with that cutter.

At this point, the spindle designated heel seat shaft in Figure 39 is rotated in a direction opposite that of the cutter, by the gear segment driven by the heel seat shaft drive cam, as designated on that figure. At the same time, the tilt cam of Figure 39 progressively changes the angularity of the work piece to develop the selected contour of the surface of the work piece.

The first cutting phase is performed in the illustrative embodiment by the first cutting contact with the one cutter which profiles approximately one-half of the finished article, but the invention contemplates that it is entirely possible to adjust the feed so that the entire profiling can be accomplished by a single cutter. The spindle upon which the work piece is mounted may be giving a longer arc of movement by adjusting the gear ratio between the gear segment and the pinion on that spindle, as will already have become apparent when these parts were described in detail.

In Figures 31 and 32, the operation of this first cut with dual cutters is illustrated. On completion of this first phase, the frame D is retracted to its forward position, and the transfer to the second cutter is begun. Figure 33 illustrates this movement to the second cutting position and change of the positions of the operating parts as the transfer proceeds as shown in Figure 34, until cutting contact is made as shown in Figure 35. The second cutting operation is merely a reversal of the direction of rotation of the work supporting spindle by means of the cam groove, roller, and segmental rack, and the movement of the transfer frame. The heel seat cam and the tilt cam repeat their prior functions.

When the cutting operation is completed, the clamping action of the jack pin is released, and the ejection assembly, as already described in detail, is brought into operation to eject the finished article, and the mechanism is restored to starting position for successive operations.

It will be understood that the operation after it is initiated is continuous. The interval during the movement of the mechanisms following the completion of the second cutting phase during which the article is ejected and is brought to initial position provides an interval for manually reloading successive work piece blanks and the operation is, therefore, continued without interruption and is entirely automatic except for the manual loading of work piece blanks.

From the foregoing description, it will appear that the invention provides means for attaining the objects as hereinbefore stated. While certain details of construction have been disclosed, it should be understood that modifications may be made in structure and relationship of the parts without departure from the principles of the invention as illustratively embodied in the specific embodiment.

What is claimed is:

1. In a machine of the class described having a main frame, and a rotary cutter mounted in said frame, the axis of rotation of which is vertical, work feeding mechanism including a cradle supporting frame pivoted on a horizontal axis, a cradle supported in said cradle supporting frame on a pivot the axis of which is parallel with the pivot axis of said cradle supporting frame, a spindle having a work seat for receiving the work piece blank, means for positioning and clamping the work piece blank on its seat, means for moving said cradle supporting frame toward and from cutting position with said rotary cutter, means for imparting turning movement to said spindle during contact of the work piece with said cutter, and means for changing the angularity of said spindle during the cutting operation, whereby the work piece is presented to the cutter to profile the work piece with predetermined contoured surfaces.

2. In a machine of the class described having a main frame, and a rotary cutter mounted in said frame, the axis of rotation of which is vertical, work feeding mechanism including a cradle supporting frame pivoted on a horizontal axis, a cradle supported in said cradle supporting frame on a pivot the axis of which is parallel with the pivot axis of said cradle supporting frame, a spindle having a work seat for receiving the work piece blank, means for positioning and clamping the work piece blank on its seat, means for moving said cradle supporting frame toward and from cutting position with said rotary cutter, means for imparting turning movement to said spindle during contact of the work piece with said cutter, means for changing the angularity of said spindle during the cutting operation, whereby the work piece is presented to the cutter to profile the work piece with predetermined contoured surfaces, and means for ejecting the finished work piece.

3. In a machine of the class described having a main frame, and a rotary cutter mounted in said frame, the axis of rotation of which is vertical, work feeding mechanism including a cradle supporting frame pivoted on a horizontal axis, a cradle supported in said cradle supporting frame on a pivot the axis of which is parallel with the pivot axis of said cradle supporting frame, a spindle having a work seat for receiving the work piece blank, means for positioning the work on its seat including an abutment member movable automatically into and out of abutment position, a jack for clamping the work piece blank to its seat, means for moving said cradle frame toward and from cutting position with said rotary cutter, means for imparting turning movement to said spindle during contact of the work piece with said cutter, and means for changing the angularity of said spindle during the cutting operation, whereby the work piece is presented to the cutter to profile the work piece with predetermined contoured surfaces.

4. A machine as claimed in claim 3 wherein the means for changing the angularity of the spindle comprises a cam on said spindle formed on varying radii, and having an upwardly inclined face.

5. In a machine of the class described having a main frame, and a pair of rotary cutters spaced apart and rotatable on parallel vertical axes, feeding mechanism including a transfer frame supported for turning movement normal to the axis of rotation of said cutters, a cradle supporting frame pivoted to said transfer frame on a horizontal axis, a cradle pivotally supported by said cradle supporting frame on a pivot axis parallel with said horizontal axis of said cradle frame, a work supporting spindle rotatably mounted vertically in said cradle, power means for operating said transfer frame alternately toward and from the cutters, respectively, power means for protracting and retracting said cradle supporting frame in respect of said cutters, and means for tilting said work supporting spindle to vary the angle of the axis thereof in respect to the axis of rotation of said cutters during cutting contact of the work with said cutters.

6. In a machine of the class described having a main frame, and a pair of rotary cutters spaced apart and rotatable on parallel vertical axes, feeding mechanism including a transfer frame supported for turning movement normal to the axis of rotation of said cutters, a cradle supporting frame pivoted to said transfer frame on a horizontal axis, a cradle pivotally supported by said cradle supporting frame on a pivot axis parallel with said horizontal axis of said cradle frame, a work supporting spindle rotatably mounted vertically in said cradle, power means for operating said transfer frame alternately toward and from the cutters, respectively, power means for protracting and retracting said cradle supporting frame in respect of said cutters, means for tilting said work supporting spindle to vary the angle of the axis thereof in respect to the axis of rotation of said cutters during cutting contact of the work with said cutters, and means for ejecting the work piece after the cutting operation is terminated.

7. In a machine of the class described having a main frame, and a pair of rotary cutters spaced apart and rotatable on parallel vertical axes, feeding mechanism including a transfer frame supported for turning movement normal to the axis of rotation of said cutters, a cradle supporting frame pivoted to said transfer frame on a horizontal axis, a cradle pivotally supported by said cradle supporting frame on a pivot axis parallel with said horizontal axis of said cradle frame, a driven shaft mounted in said cradle frame the axis of which is parallel with the pivot axis of said cradle, a work supporting spindle rotatably mounted vertically in said cradle, power means for operating said transfer frame alternately toward and from the cutters, respectively, power means operatively connected with said driven shaft for protracting and retracting said cradle frame in respect of said cutters, and means for tilting said work supporting spindle including an adjustable cam carried by said spindle, and a cam follower in the form of a roller supported adjacent to said cam by said cradle supporting frame to vary the angle of the axis thereof in respect to the axis of rotation of said cutters during cutting contact of the work with said cutters.

8. In a machine of the class described having a main frame, and a pair of rotary cutters spaced apart and rotatable on parallel vertical axes, feeding mechanism including a transfer frame supported for turning movement normal to the axis of rotation of said cutters, a cradle supporting frame pivoted to said transfer frame on a horizontal axis, a cradle pivotally supported by said cradle supporting frame on a pivot axis parallel with said horizontal axis of said cradle frame, a driven shaft mounted in said cradle frame the axis of which is parallel with the pivot axis of said cradle, a work supporting spindle rotatably mounted vertically in said cradle, a jack automatically operated to clamp and release on said spindle, power means operatively connected with said drive shaft for operating said transfer frame alternately toward and from the cutters, respectively, power means for protracting and retracting said cradle frame in respect of said cutters, and means for tilting said work supporting spindle including an adjustable cam carried by said spindle, and a cam follower in the form of a roller supported adjacent to said cam by said cradle supporting frame to vary the angle of the axis thereof in respect to the axis of rotation of said cutters during cutting contact of the work with said cutters.

9. A machine as claimed in claim 8 including means for ejecting the work piece when said jack releases the said work piece from clamping adjustment.

10. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle frame, the axis of which is parallel with the pivot axis of said cradle, a work supporting spindle mounted in said cradle arranged to receive and support a work piece with the surface thereof adjacent to and normally substantially parallel with the cutting face of said cutter, a cam on said driven shaft having an operating surface which is parallel to the axis of said power driven shaft, a cam follower adjustably mounted on the main frame cooperating with said cam to protract and retract said cradle supporting frame toward and from said cutter, and means for varying the angularity of said work supporting spindle during the time of cutting contact of the work with said cutter.

11. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle supporting frame, the axis of which is parallel with the pivot axis of said cradle, a work supporting spindle mounted in said cradle arranged to receive and support a work piece with the surface thereof adjacent to and normally substantially parallel with the cutting face of said cutter, a cam on said driven shaft having an operating surface which is parallel to the axis of said power driven shaft, a cam follower adjustably mounted on said main frame cooperating with said cam to protract and retract said cradle supporting frame toward and from said cutter, and means for varying the angularity of said work supporting spindle during the time of cutting contact of the work with said cutter, including a cam operatively connected with said spindle and a cam follower supported on said cradle frame.

12. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle, the axis of which is parallel with the pivot axis of said cradle, a work supporting spindle mounted in said cradle arranged to receive and support a work piece with the surface thereof adjacent to and normally substantially parallel with the cutting face of said cutter, a cam on said driven shaft having an operating surface which is parallel to the axis of said power driven shaft, a cam follower carried by said main frame cooperating with said cam to protract and retract said cradle supporting frame toward and from said cutter, a cam on said spindle, a roller carried by the cradle frame for contact with the surface of said cam to selectively vary the angularity of said work supporting spindle during the time of cutting contact of the work with said cutter.

13. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle, the axis of which is parallel with the pivot axis of said cradle, a work supporting spindle mounted in said cradle arranged to receive and support a work piece with the surface thereof adjacent to and normally substantially parallel with the cutting face of said cutter, a jack for clamping and releasing said work piece on said spindle, a cam on said driven shaft having an operating surface which is parallel to the axis of said power driven shaft, a cam follower carried by said main frame cooperating with said cam to protract and retract said cradle supporting frame toward and from said cutter, a cam on said spindle, and a roller supported by the cradle supporting frame for contact with the surface of said cam for varying the angularity of said work supporting spindle during the time of cutting contact of the work with said cutter.

14. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle, the axis of which is parallel with the pivot axis of said cradle, a work supporting spindle mounted in said cradle arranged to receive and support a work piece with the surface thereof adjacent to and normally substantially parallel with the cutting face of said cutter, a jack for clamping and releasing said work piece on said spindle, a cam on said driven shaft having an operating surface which is parallel to the axis of said power driven shaft, a cam follower carried by said main frame cooperating with said cam to protract and retract said cradle supporting frame toward and from said cutter, a cam on said spindle, a roller supported by the cradle supporting frame for contact with the surface of said cam for varying the angularity of said work supporting spindle during the time of cutting contact of the work with said cutter, and means for ejecting said work piece when said jack operates to release the same.

15. In a machine of the class described having a main frame and a rotary cutter having a vertical cutting face, and power means for rotating said cutter, feeding mechanism including a cradle supporting frame rockable on an axis normal to the axis of rotation of said cutter, a cradle pivotably mounted in said cradle supporting frame on an axis parallel with the pivot axis of said cradle supporting frame, a power driven shaft in said cradle frame, the axis of which is parallel with the pivot axis of said cradle, a work supporting spindle mounted in said cradle arranged to receive and support a work piece with the surface thereof adjacent to and normally substantially parallel with the cutting face of said cutter, a cam on said driven shaft having an operating surface which is parallel to the axis of said power driven shaft, a cam follower cooperating with said cam to protract and retract said cradle supporting frame toward and from said cutter in timed relation, and means for varying the angularity of said work supporting spindle during the time of cutting contact of the work with said cutter, said means including a cam on said spindle, and a cam follower comprising a roller supported adjacent to said cam.

16. In a machine of the class described having a main frame, duplicate rotary members each having a substantially vertical working face for cutting, abrading, or polishing action, feeding mechanism including a transfer frame mounted on the main frame on a vertical pivot and arranged to move in an arc, means for actuating said transfer frame alternately toward and from said rotary members, respectively, a cradle supporting frame pivoted to said transfer frame on a horizontal axis, a cradle supported in said cradle supporting frame on a pivot the axis of which is parallel with the pivot axis of said cradle supporting frame, a spindle having a work seat for receiving the work piece and for positioning and clamping said work piece on said seat, means for moving said cradle frame toward and from operative position with said rotary members, means for imparting turning movement to said spindle during contact of the work piece with said rotary members, respectively, and means for changing the angularity of said spindle during operative contact with said rotary members, respectively.

17. In a machine of the class described having a main frame, duplicate rotary members each having a substantially vertical working face for cutting, abrading, or polishing action, feeding mechanism including a transfer frame mounted on the main frame on a vertical pivot and arranged to move in an arc, means for actuating said transfer frame alternately toward and from said rotary members, respectively, including a power driven cam and cam follower, a cradle supporting frame pivoted to said transfer frame on a horizontal axis, a cradle supported in said cradle supporting frame on a pivot the axis of which is parallel with the pivot axis of said cradle supporting frame, a spindle having a work seat for receiving the work piece and for positioning and clamping said work piece on its seat, means for moving said cradle frame toward and from operative position with said rotary members, means for imparting turning movement to said spindle during contact of the work piece with said rotary members, respectively, and means for changing the angularity of said spindle during operative contact with said rotary members, respectively.

18. In a machine of the class described having a main frame, duplicate rotary members each having a substantially vertical working face for cutting, abrading, or polishing action, feeding mechanism including a transfer frame mounted on the main frame on a vertical pivot and arranged to move in an arc, means for actuating said transfer frame alternately toward and from said rotary members, respectively, a cradle supporting frame pivoted to said transfer frame on a horizontal axis, a cradle supported in said cradle supporting frame on a pivot the axis of which is parallel with the pivot axis of said cradle supporting frame, a spindle having a work seat for receiving the work piece and for positioning and clamping said work piece on its seat, a clamp device automatically operated to clamp and release the work piece in timed relation to the movement of said cradle supporting frame, means for moving said cradle frame toward and from operative position with said rotary members, means for imparting turning movement to said spindle during contact of the work piece with said rotary members, respectively, and means for changing the angularity of said spindle during operative contact with said rotary members, respectively.

19. In a machine of the class described, a main frame, duplicate rotary members each having substantially a vertical working face, feeding mechanism including a transfer frame mounted on the main frame and arranged to move in an arc, means for actuating said transfer frame alternately toward and from said rotary members, respectively, a cradle supporting frame carried by said transfer frame and arranged to rock on a horizontal axis, a cradle supported in said cradle supporting frame on a pivot the axis of which is parallel with the pivot axis of said cradle supporting frame, a spindle having a work seat for receiving the workpiece and for positioning and clamping said workpiece on its seat, a driven shaft rotatably mounted in said cradle supporting frame, a cam on said driven shaft cooperatively arranged with a cam follower for advancing and retracting said cradle frame toward and away from said rotary members, power connections between said spindle and said driven shaft for imparting turning movement thereto, and means for changing the angularity of said spindle including a cam attached to said spindle and cooperatively related to a second cam follower to effect an angular adjustment of said spindle during turning movement thereof.

20. In a machine of the class described, a main frame, duplicate rotary members each having substantially a vertical working face, feeding mechanism including a transfer frame mounted on the main frame and arranged to move in an arc, means for actuating said transfer frame alternately toward and from said rotary members, respectively, a cradle supporting frame carried by said transfer frame and arranged to rock on a horizontal axis, a cradle supported in said cradle supporting frame on a pivot the axis of which is parallel with the pivot axis of said cradle supporting frame, a spindle having a work seat for receiving the workpiece and for positioning and clamping said workpiece on its seat, a driven shaft rotatably mounted in said cradle supporting frame, a cam on said driven shaft cooperatively arranged with a cam follower for advancing and retracting said cradle frame toward and away from said rotary members, power connections between said spindle and said driven shaft for imparting turning movement thereto, means for changing the angularity of said spindle including a cam attached to said spindle and cooperatively related to a second cam follower to effect an angular adjustment of said spindle during turning movement thereof, and a single power actuated means for operating said transfer frame and said driven shaft in predetermined timed relation.

References Cited in the file of this patent
UNITED STATES PATENTS

| | | |
|---|---|---|
| 1,488,534 | Folsom | Apr. 1, 1924 |
| 1,704,319 | Gulliford | Mar. 5, 1929 |
| 1,787,615 | Cook | Jan. 6, 1931 |
| 2,071,433 | Russ | Feb. 23, 1937 |
| 2,076,123 | Gialdini | Apr. 6, 1937 |
| 2,090,024 | Bradbury | Aug. 17, 1937 |
| 2,405,941 | Clausing | Aug. 20, 1946 |